J. T. AUSTIN.
ORGAN.
APPLICATION FILED FEB. 20, 1905.

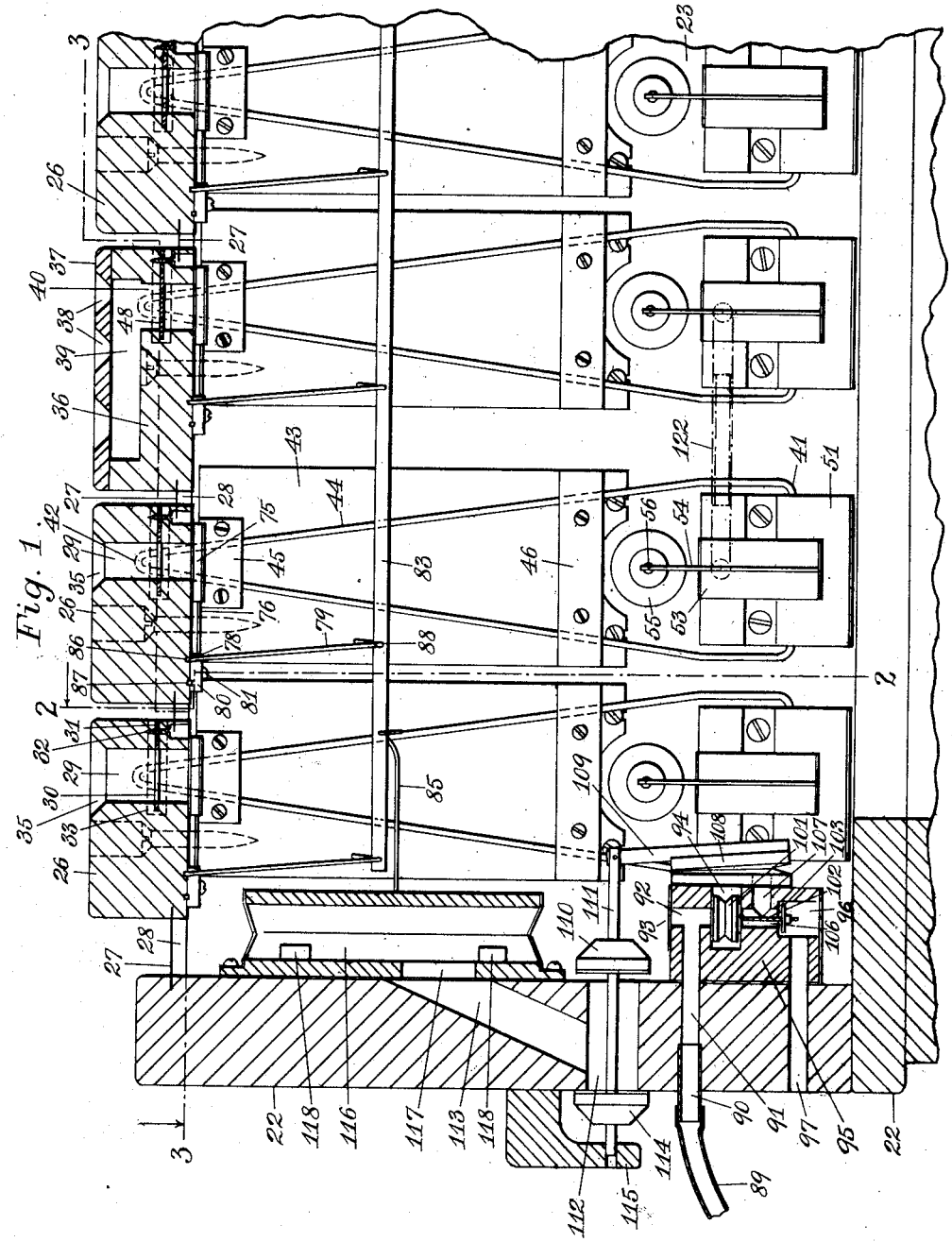

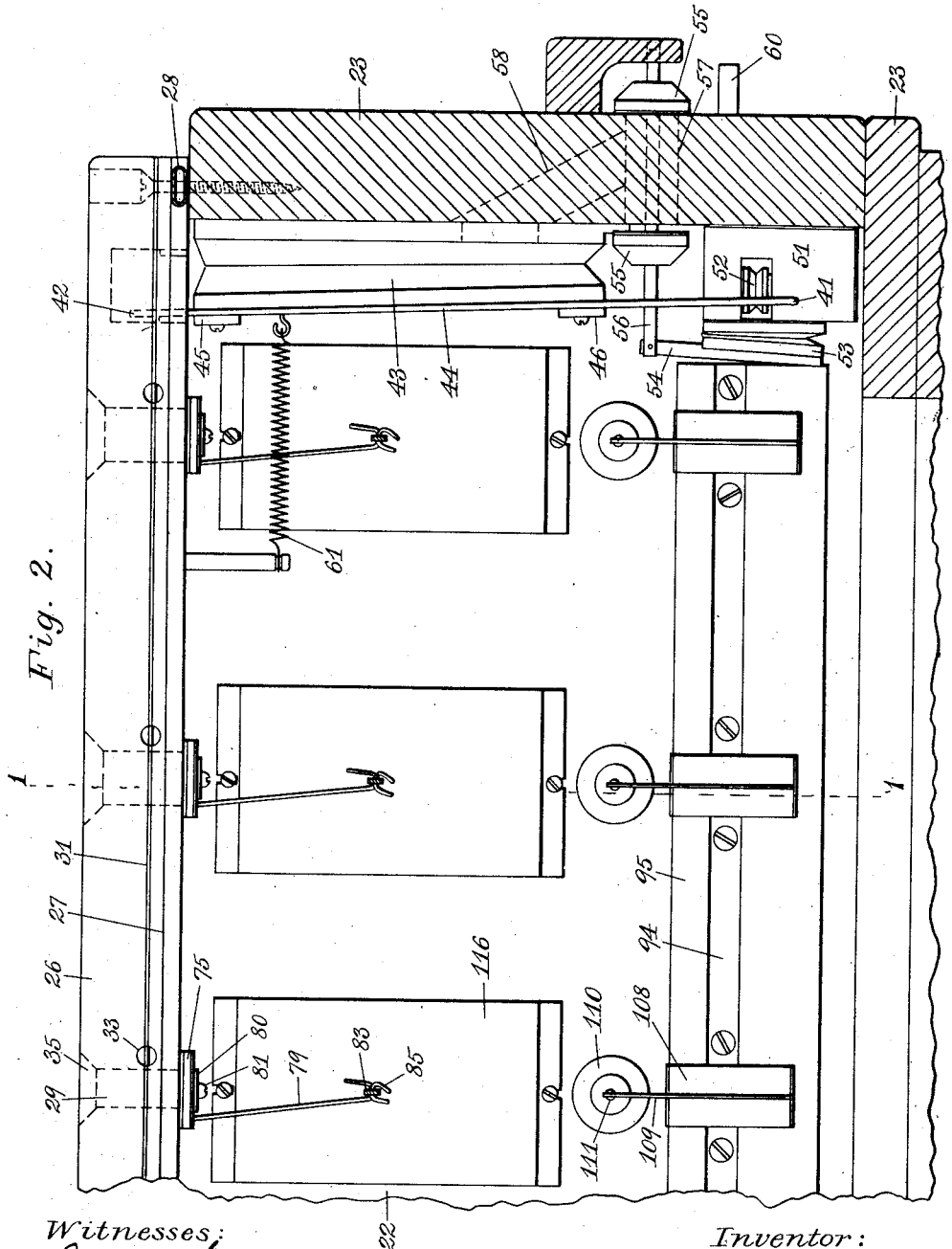

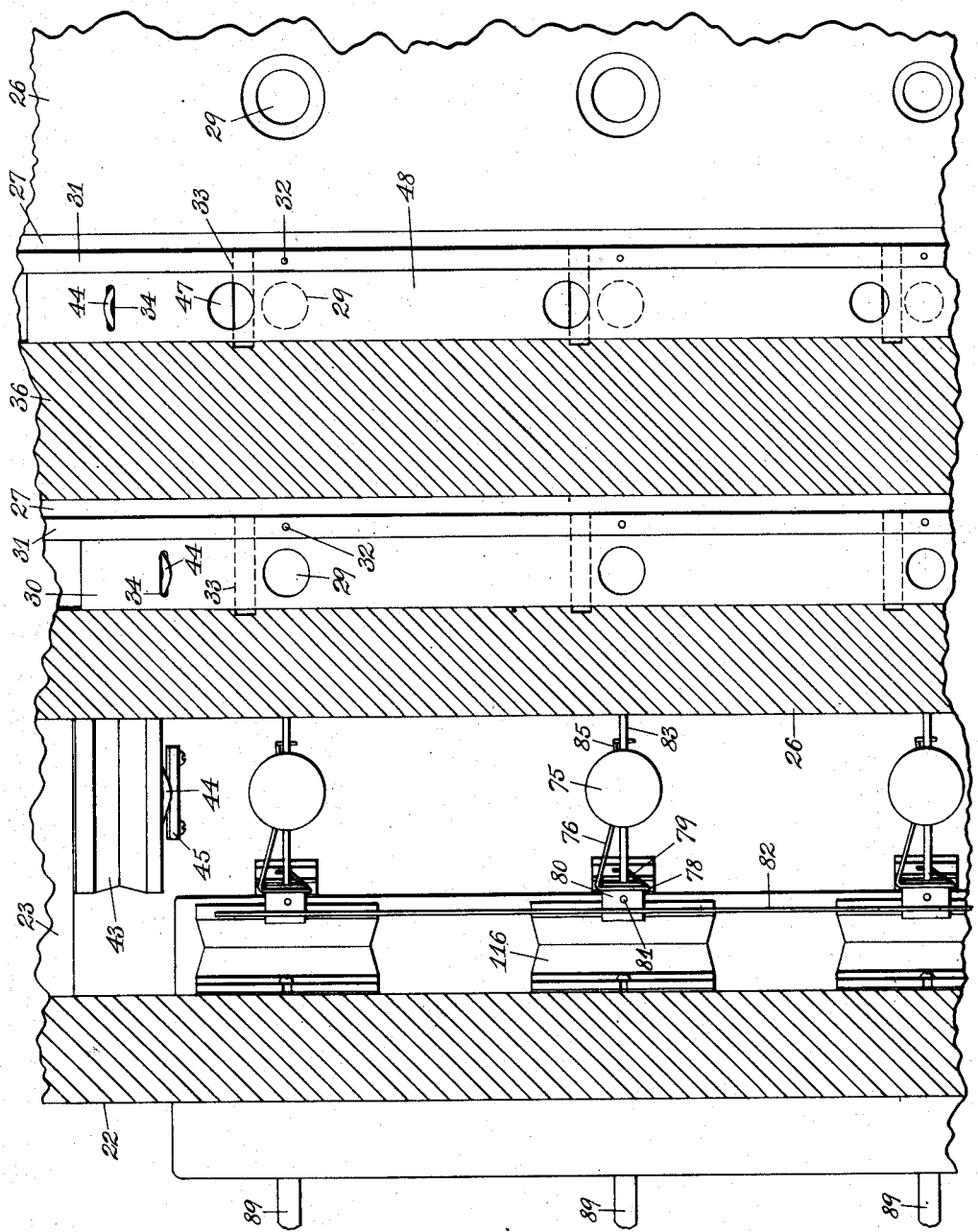

1,100,045.

Patented June 16, 1914.
4 SHEETS—SHEET 4.

Witnesses:
Joseph Merritt
H. Mallner

Inventor:
John T. Austin,
By Wm H Honiss, Atty.

UNITED STATES PATENT OFFICE.

JOHN T. AUSTIN, OF HARTFORD, CONNECTICUT, ASSIGNOR TO AUSTIN ORGAN COMPANY, OF HARTFORD, CONNECTICUT, A CORPORATION OF MAINE.

ORGAN.

1,100,045.  Specification of Letters Patent.  Patented June 16, 1914.

Application filed February 20, 1905. Serial No. 246,383.

*To all whom it may concern:*

Be it known that I, JOHN T. AUSTIN, a citizen of the United States, and resident of Hartford, in the county of Hartford and State of Connecticut, have invented certain new and useful Improvements in Organs, of which the following is a full, clear, and exact specification.

This invention relates to the wind chests and appurtenant devices of organs and similar instruments, the object being to provide an improved construction and organization of this part of the instrument, whereby are secured the advantages of simplicity, low cost of construction, lessened liability to derangement and leakage, and ease of examination and repairs.

Figure 6:
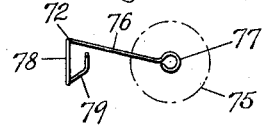
Figure 7:
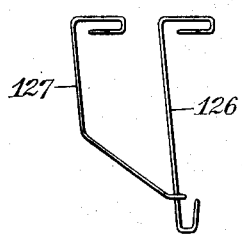
Figure 4:
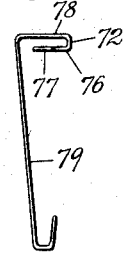
Figure 5:
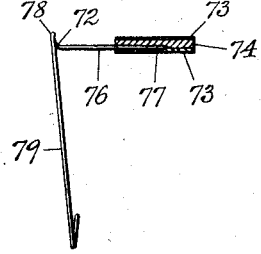
Figure 8:
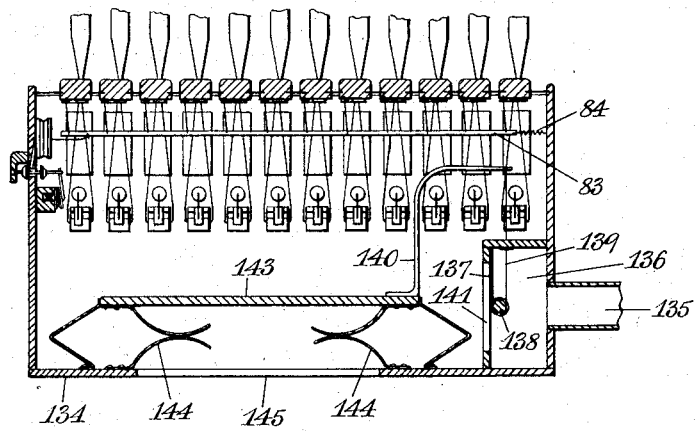

Figure 1 is a side view in section on the line 1—1 of Fig. 2, showing part of an organ with the improvements applied thereto. Fig. 2 is a sectional front view on the line 2—2 of Fig. 1. Fig. 3 is a sectional plan view on the line 3—3 of Fig. 1. Figs. 4, 5 and 6 are front, side, and top views, respectively, of the valve lever. Fig. 7 is a side view showing a pair of valve levers coupled together. Fig. 8 is a sectional side view of a wind chest, showing a method of automatically regulating and controlling the wind supply.

The wind chest herein shown and described is of the general character of that shown and described in my U. S. Patent No. 537,664, of April 16, 1895, in the respect that the valve mechanism is inside of the wind chest and is made accessible for observation and adjustment while the organ is in operation by means of an air-lock door, through the walls of the chest. The air passages leading to the pipes or other speaking instrumentalities communicate through the wall of the chest directly with the interior thereof; and the various pneumatic actions, which control or operate the key and stop mechanisms of the instrument are situated upon the inner walls of the wind chest and receive air directly from that chest, without the interposition of extended pipes or passages. As a brief designation of this type of wind chest it will herein be referred to as a universal wind chest. On account of the extended area of the inner wall of the wind chest, it is found desirable to make provision for a considerable degree of contraction and expansion of or between the members constituting those walls. Provision for this contraction and expansion constitutes one of the features of the present invention. Moreover, the fact that the pneumatic actions are located upon the inner wall of this universal wind chest enables them to receive their required air pressure directly from the chest itself, without the intervention of extended air passages. In the present invention this feature is utilized to great advantage by the use of extended pneumatic action bars, upon which the primary and secondary pneumatic motors are so mounted and connected as to effect their communication with the wind chest and with the external atmosphere in an exceedingly direct and convenient way. According to this invention also the bar member upon which these actions are mounted is of a form which enables it to be made in extended lengths, thus enabling it to be manufactured at low cost. These action bars are provided with air slots or channels which extend their entire length and therefore may be sawed out; and these bars may be used in lengths which extend entirely across a wall of the wind chest, as illustrated herein by the bars upon which the key actions are mounted; or they may be separated into short lengths by transverse cuts, using one section for each pneumatic action, as illustrated herein by the bar sections 51 upon which the stop actions are mounted.

The pipe bars 26 and 36 with their connecting strips 27 form the top of the wind chest, the walls 22 and 23 forming the sides and ends, respectively, of the chest. The ends of the pipe bars rest on and are secured to the end walls 23 of the wind chest (Fig. 2) and the bars are joined together and to the side walls 22 by strips 27 of sheet zinc or other suitable metal let into the sides of the bars and into the side walls 22. These strips are preferably seated in grooves in the adjacent faces of the bars, and constitute air tight slip joints between the bars, allowing the latter to contract and expand freely and independently of each other. Elastic washers 28, preferably formed of sections of rubber tube, are interposed between the zinc strips and the tops of the end walls 23. The pressure of the zinc strips upon these washers after the bars have been secured in place compresses the washers so as to effectually close the ends of the openings between the adjacent bars, and prevent leakage. The organ pipes rest on the bars 26 in the sockets 35 formed in the upper ends of the ports or passages 29 through which the wind passes from the wind chest to the pipes when the latter are to speak. The pipes supported by any one bar may all belong to the same stop; and the whole register may be spaced similarly on all the bars, thus locating substantially in one transverse line the series of pipes controlled by each particular key. Each port 29 is normally closed against the entrance of air from the wind chest by a valve or pallet 75 formed of a layer of felt 74 with a layer of leather 73 secured to each side of it (Fig. 5).

The pallet 75 is carried by a valve lever formed of an integral piece of wire and comprising the eye 77, the upper arm 76, the hinge or fulcrum 78 and the lower arm 79, the two arms standing nearly at right angles to each other, and joined by the fulcrum member 78. The pallet 75 is secured to the upper arm 76 concentrically with the eye 77, which thus serves not only to increase the area on which the pallet is supported, but prevents any accidental tipping of the latter. Although the round eye form is preferable for the end of the arm 76, it is obvious that there are many other suitable shapes which may be employed. The hinge 78 is seated and turns in a pivot groove formed by a saw kerf 86 (Fig. 1) let into the underside of the pipe bar 26, this disposition of the parts being made possible by the bend 72 (Figs. 4 and 5) in the upper arm 76, where it joins the hinge 78, thus carrying the arm 76 to a plane below the under surface of the bar 26. The hinge 78 is held in place by the button 80 secured to the underside of the pipe bar 26 by the screw 81 and held against twisting by the wire 82, half of whose circumference is let into the button 80 while the other half fits the saw kerf 87 in the bar 26. The lower end of the arm 79 of the valve lever is bent into the hole 88 of the trace or tracker 83, thus securing the two members together while allowing such motion as is necessary. Endwise movement of the trace 83 will therefore either open or close the holes 29 in the pipe bar by the motion communicated through the lower lever arm 79, the hinge 78 and the upper arm 76 to the pallet 75 which will thus be swung downward to open the port, and upward to close the port.

The wire valve levers above described have many important advantages. As they are very light, their aggregate resistance does not interfere with the prompt response of the action to the key. Each lever forms its own hinge or fulcrum and its wire construction makes it easy to correct any slight local misadjustment, by bending the wire. The wire valve lever also has a certain amount of spring in itself, so that it forms a spring return cushion which materially aids the repetition of the action in rapid passages. This spring quality also causes the pallet to leave its seat faster than the normal speed of the action, since the air pressure which holds the pallet against its seat must first be overcome before the pallet will move. The lever will therefore yield a little until this pressure is overcome and the pallet will then be carried away from its seat at an increased rate of speed due to the combined action of the movement of the trace and the recovery of the spring in the lever. The full volume and pressure of air will therefore be admitted to the organ pipe more suddenly than would take place with a more gradual opening of the valve, and the initial quality of the tone will be thereby improved. The springing properly of the valve also permits the pressure on the back of the pallet to close the opening tightly even if a slight misadjustment of the valve or the action should tend to prevent such closing. These wire valves are shown, described and claimed in a division of this application, Serial No. 642,196, filed Aug. 3, 1911.

The trace 83, by which all the pallets subject to any one key are connected and operated, is held in the position of rest and returned thereto by the spring 84 (Fig. 8). The operating motion is given by a set of pneumatic devices of which there is one for each trace. Each set comprises the primary pneumatic 101 (Fig. 1) the secondary pneumatic 108 and the motor pneumatic 116, with their valves, and communicating passages. Each pair of primary and secondary pneumatics 101 and 108 is supported by the bar 95, which is preferably made long enough to carry a number of pairs of such pneumatics. The slot 94, to the upper side of which the primary 101 is secured, is open to the wind chest (Fig. 2) and the slot 96 is closed to the wind chest, but open to the atmosphere, through the holes 97, which extend through the bar 95 and the side wall 22 of the wind chest (Fig. 1). A sufficient number of these holes is provided to always maintain atmospheric pressure in the slot 96 no matter how many of the pneumatics are in operation at once.

Over each primary 101 is a passage 92 formed in the bar 95 and communicating at its lower end with the inside of the primary 101 and at its upper end with the wind chest through a "bleed-hole" 93. The passage 92 also communicates by means of the passage 91 through the bar 95 and the side wall 22 with the stem 90 and the tube 89, which latter is normally closed to the atmosphere, but is opened to it by any suitable valve devices whenever the corresponding key is depressed. Below each primary 101 is another passage 106 also formed in the bar 95 and extending from the slot 94 to the slot 96 and connected by the passage 107 with the interior of the secondary pneumatic 108. A valve stem 102 extends through the passage 106 being secured at its upper end to the movable under leaf of the primary 101 and carrying at its lower end the pallet 103. This construction of the bar 95 carrying the primary and secondary pneumatics gives a compact integral arrangement which is not only cheap to manufacture, but possesses the further advantage of being easy to locate for proper coöperation with the other working parts of the instrument. The air ducts are short and the opening into the secondary pneumatic 108 is situated at the most favorable point for the exhausting operation.

The secondary pneumatic 108 is provided with a lever 109 pivoted at its upper end to the valve stem 111 which latter extends through a hole 112 in the side wall 22 and carries the inner and outer pallets 110 and 114, respectively, the outer end of the stem 111 being supported by the bar 115, secured to and extending along the outer surface of the wall 22. A passage 113 connects the interior of the motor pneumatic 116 with the passage 112. Felt stops 118 are provided for the pneumatic 116 to close against.

The tube 89 being normally closed to the atmosphere, the wind chest pressure on the interior of the primary 101 keeps the passages 106 and 107 and the interior of the secondary 108 open to the atmosphere, thereby enabling the wind chest pressure to act on the outside of the secondary 108 which through its connections keeps the passage 112 closed by means of the pallet 114, the area of pressure on the secondary 108 being enough in excess of that of the pallet 114 to effect this result. Thus the passage 113 is normally in communication with the wind chest and therefore the pressure on the outside and on the inside of the motor bellows 116 is equalized, so that the spring 84 (Fig. 8) aided by the pressure on the underside of the row of pallets 75, is enabled to hold all the parts at rest.

The operation of the above described parts is as follows:—The depression of the key on the organ opens the tube 89 to the atmosphere in any well known manner, thus giving atmospheric pressure in the channel 92 and in the inside of the primary pneumatic 101. The wind chest pressure in the slot 94 causes the primary 101 to collapse, thereby opening the channel 106 to the slot 94, and closing it to the slot 96, by means of the pallet 103. This action puts the inside of the secondary pneumatic 108 in communication with the wind chest pressure through the passage 107, thereby balancing the pressure on the outside of the secondary 108, which in turn releases the lever 109 and the pallet 114. The channel 112 is thus opened to the atmosphere and closed to the wind chest by the pressure on the pallet 110, thus opening the channel 113 and the inside of the bellows 116 to the atmosphere. The wind chest pressure then collapses the pneumatic 116, thereby moving the trace 83 by means of the operating wire 85. The movement of the trace 83 is communicated to all of the valve levers to which it is connected, by means of the lower arms 79, the fulcrums 78 and the upper arms 76, causing the pallets 75 to drop and uncover the ends of the ports 29, thus admitting wind to all of the ports in this note of the different registers. As soon as the organ key is released the tube 89 is cut off from the atmosphere, thus permitting the primary pneumatic 101 to resume its normal position through the entrance of the air from the wind chest through the bleed hole 93. The pallet 114 is once more drawn over the outer end of the passage 112, thus equalizing the pressure on both sides of the motor pneumatic 116, and permitting the spring 84 to return the trace 83 with the pallets 75 to their normal positions.

The opening and closing of the series of holes 29 in any one pipe bar 26 to permit the notes of that stop to speak when called on, is effected by means of the slider 30 which is fitted to slide to "on" and "off" positions in a channel sawed in the bar 26. The slider 30 is provided with a series of holes 47 (Fig. 3) which are so located as to coincide with the holes 29 when the slider is in its "on" position. When the slider is in its "off" position as in the case of the slider 48 for the bar 36, the holes 29 and 47 are out of line, thus preventing any entrance of wind through the port 29 to the organ pipe. A bearer 31 (Fig. 1) is inserted in the outer edge of the slider slot, and a screw 32, counterbored deeply into the lower portion of the bar 26 and extending through the bearer 31 into the upper portion of the bar, draws the two parts of the bar and the bearer firmly together. The depth of the counterbore and the consequent short distance which the screw extends into the upper part of the bar reduces to a minimum the chances of trouble from any shrinking or swelling of the wood, as there can never be much variation between the length of such a short screw and the material surrounding it. The bearer inserted between the slot edges makes a very tight joint as the tendency of the edges of the saw slots in wood is to spring together. Vent holes 33 (Fig. 3) are provided in the bars 26 to permit the escape of any air pressure which otherwise might possibly find its way along the slider channel from one open port 29 to the next port, and thus sound a pipe intended to be silent.

Each slider 30 is provided with a set of pneumatic operating devices similar in many details to the sets which control the speaking pallets 75. Each set of devices comprises the primary pneumatic 52 (Fig. 2) the secondary pneumatic 53, the motor pneumatic 43, the V-lever 44, and suitable valves and air passages, each set of devices being connected by means of the tube 60 with suitable mechanism operated by the stop keys or tablets, for opening and closing the tube to the atmosphere. The lever 44 is formed of wire and its point 42 fits the slot 34 in the slider 30, while the two ends 41 of the lever are pivoted in the block 51 secured to the side wall 23 and carrying the primary and secondary pneumatics 52 and 53 respectively. Cleats 45 and 46 clamp the lever 44 to the motor pneumatic 43. The location of the fulcrum ends 41 at some distance from the motor pneumatic 43 gives the latter a more advantageous pull on the slider 30 than could be obtained with the same length of bellows hinged in the customary manner. The tube 60 being normally closed to the atmosphere, the position of the pneumatics 52 and 53 acting on the valve pallets 55 keeps the pressure equalized on the outside and inside of the motor pneumatic 43 similarly as described in connection with the key primary 101. A spring 61 serves to return the slider 30 and the pneumatic 43 after the latter has acted.

The operation of the slider parts is as follows:—The slider 48 being in its "off" position and the tube 60 closed to the atmosphere, the drawing on of the stop key by the performer opens the tube 60 to the atmosphere, thus causing the primary and secondary pneumatics 52 and 53, respectively, to connect the inside of the motor bellows 43 with the atmosphere through the channels 57 and 58, similarly to the method described in connection with the note operating devices. The wind chest pressure is thus enabled to collapse the pneumatic 43, and cause the slider lever 44 to swing on its pivot 41, and draw the slider to the "on" position, as shown by the slider 30. Whenever the stop key is again pushed in, the tube 60 is once more closed to the atmosphere, thus equalizing the pressure on both sides of the pneumatic 43, and permitting the spring 61 to return the slider and the bellows 43 to the "off" position.

In order to provide for the employment of additional pipes at any portion of any stop or register, the pipe bar, as shown in the bar 36 (Fig. 1) may have a chamber 39 formed over each passage 40 into the wind chest. The chamber 39 is covered by a cap 37 in which are formed the pipe sockets 38. Three are shown in the drawing though it is obvious that a greater or less number may be provided as desired.

As the large diameter of some organ pipes prevents their being placed near enough together to be properly controlled by the slider in the small amount of movement sufficient for the smaller pipes of the register, the pipes may be placed alternately on adjacent bars. The two corresponding sliders may then be worked as one by connecting their actuating passages by a tube 122 (Fig. 1) so that the opening of the single actuating tube 60 to the atmosphere causes the two connected primaries 52 to collapse together.

In the case of a very large pipe, it may happen that a sufficient amount of wind to properly sound the pipe cannot pass through the hole 29. In such a case an extra hole may be made beside the other one so that both holes open into one channel, which is in direct communication with the organ pipe. The two pallets controlling the holes may then be operated as one by coupling the two valve levers 126 and 127 together as shown in Fig. 7.

In Fig. 8 is shown a method controlling the wind supply and regulating the pressure where for lack of space or any other reason the pumping and regulating devices shown and described in my aforesaid Patent No. 537,664, cannot be employed. The wind is introduced through the pipe 135 from any suitable supply mechanism. A chamber 136 is provided in one part of the wind chest having an opening 141 into the interior of the wind chest, this opening being covered with vertical slats, which, while permitting the ready passage of the wind, form a support for the curtain 137 against outside pressure. The curtain is secured at its upper end to the wall of the chamber 136 and carries a roll 138 on its lower end. An opening 145 to the atmosphere is formed in the bottom 134 of the wind chest, and this opening has a covering 143 of bellows form provided with springs 144 which maintain a constant tension on the air inside the wind chest. To the top of the bellows is secured an arm or arms 140 extending over the top of the chamber 136, and carrying a cord 139 on its outer end which passes through the top of the chamber 136 and has a few turns around the curtain roller 138. As the supply of air in the wind chest increases, the top of the bellows 143 will be crowded downward, carrying with it the arm 140 and thereby permitting the roller 138 to drop and cause the curtain 137 to gradually close the opening 141 until the wind supply is cut off. As soon as the reduction of the volume of air within the wind chest permits the top of the bellows 143 to rise, the curtain 137 is correspondingly raised and a renewal of the wind supply permitted. The pressure through the pipe 135 to the chamber 136 is preferably greater than that required in the wind chest; and this pressure is thus brought so close to the wind chest that it is always immediately available when wanted, thus maintaining a uniform pressure in the wind chest, and precluding any chance of that pressure falling appreciably below the standard or nominal pressure when an unusually large volume of air is suddenly evacuated through the pipes. This prompt replenishing of the air supply could not take place if the source of supply were remote from the wind chest, and connected thereto by restricted and tortuous passages.

I claim as my invention:—

1. A pipe bar for organs, provided with a slider channel, a slider valve in the channel, a series of pipe ports through the bar and slider valve, and vent recesses leading from the channel between the said ports, for the escape of air leaks therefrom.

2. A pipe bar for organs, provided with a slider channel, a slider valve in the channel, a series of pipe ports through the bar and slider valve, and vent recesses leading from above and below the slider valve between the said ports to prevent the air pressure from passing along the slider from one port to another.

3. The combination, in pipe organs, of separate bars for different series of the pipes, each bar being provided with a slider channel and a slider valve, an operating lever for each valve, and a pneumatic motor for each lever.

4. In pipe organs, the combination with means for supporting a series of pipes, a slider channel in said supporting means, a slider valve in said channel, and means for operating said slider valve, comprising a valve lever pivotally mounted at one end, with the other end engaging the slider valve, and a pneumatic motor engaging the said lever between its ends, for swinging the lever to move the slider valve.

5. The combination, in pipe organs, of a universal wind chest, means forming a part of the ceiling of the chest, for supporting a series of organ pipes, a slider channel in said supporting means, a slider valve in said channel, a valve operating lever having its lower end pivotally mounted upon the side wall of the wind chest, with its upper end extending into engagement with the slider valve, and a pneumatic motor engaging the said lever between its ends, for operating the slider valve.

6. The combination, in pipe organs, of a universal wind chest, means forming a part of the ceiling of the wind chest for supporting a series of pipes, a slider valve in said pipe support, and means for operating the slider valve, comprising a motor pneumatic secured to the end wall of the wind chest, a removable block also attached to the side wall below the said motor pneumatic, a primary and a secondary pneumatic mounted in said block, and connecting with the said motor pneumatic, and a bifurcated lever having its lower ends pivotally supported in the said block, with its upper end engaging the said slider valve, the lever intermediate its ends being engaged by the said motor pneumatic.

7. The combination, in pipe organs, of a removable bar for supporting a series of pipes, a slider channel in said bar, a slider valve in said channel, and means for operating the said slider valve, comprising a lever having a bifurcated lower end pivoted to the side wall, and having its upper end in engagement with the said slider valve, and a motor pneumatic mounted below the said supporting bar and engaging with the said lever.

8. The combination, with an organ wind chest, of a series of pipe ports in the wall of the chest, a pivot groove in said wall extending alongside of the said ports, and valves for the said ports, each pivotally seated in the said groove.

9. The combination, with an organ wind chest, of a series of pipe openings in the upper wall of the chest, a downwardly opening pivot groove in said wall extending alongside of said series of ports, and a series of valves for the said ports each pivotally seated and held in said groove, and means for operating said valves.

10. The combination, with an organ wind chest, of a plurality of series of pipe ports in the wall of the chest, a corresponding plurality of pivot grooves extending alongside of the respective series of ports, valves for the said ports pivotally seated in the respective grooves, and means for connecting and operating said valves.

JOHN T. AUSTIN.

Witnesses:
 JAS. W. GREEN,
 W. H. HONISS.

Copies of this patent may be obtained for five cents each, by addressing the "Commissioner of Patents. Washington, D. C."